Nov. 8, 1966   F. M. GALLOWAY ET AL   3,284,259

METHOD OF MAKING REINFORCED HOSE

Original Filed May 23, 1962

INVENTORS.
FREDERICK M. GALLOWAY
ROBERT H. SINNAMON
BY

ATTORNEY.

United States Patent Office 3,284,259
Patented Nov. 8, 1966

3,284,259
METHOD OF MAKING REINFORCED HOSE
Frederick M. Galloway, Langhorne, and Robert H. Sinnamon, Huntingdon Valley, Pa., assignors to H. K. Porter Company, Inc., Pittsburgh, Pa., a corporation of Delaware
Original application May 23, 1962, Ser. No. 197,156, now Patent No. 3,168,910, dated Feb. 9, 1965. Divided and this application May 27, 1963, Ser. No. 287,734
2 Claims. (Cl. 156—149)

This is a division of application Serial No. 197,156, filed May 23, 1962, now Patent 3,168,910.

This invention relates to hose of the character of that used for connecting heaters to the cooling systems of automotive power plants, appliances such as clothes washers to domestic water supplies and for other more or less analogous purposes and is especially directed to hose suitable therefor which contains a yarn reinforcement embedded for the most part in its elastomeric wall but slightly exposed at grooves formed in the latter during manufacture.

Hose intended for the aforesaid uses has been made by extruding uncured elastomer through an annular orifice in continuous tubular lengths of up to or exceeding 800' which are then passed through a machine which by knitting, braiding, weaving or lapping applies a layer of yarn reinforcement to the outer surface of the tube. Next an overlying outer cover of an uncured elastomer, usually of about the same composition as the inner tube, is extruded onto the yarn reinforcement prior to encasing the assembly in a metallic lead jacket extruded over and adapted to contain it while the elastomeric components are being cured, normally at high temperature while under internal pressure, after which the jacket is stripped from the finished hose and the lead re-used.

It has been proposed to omit extrusion of the outer elastomeric layer over the yarn reinforcement and to cause the next innermost one to be forced during vulcanizing through the reinforcement interstices as for example in U.S. Patent 2,652,093 but since in practice the reinforcement cannot be maintained in precise coaxial relation with the hose outer surface during vulcanizing it does not become uniformly covered by the elastomeric material and thus in the finished hose remains exposed on the surface at local areas and hence subject to abrasion and chemical and biological deterioration.

In accordance with the present invention, however, it is practical to provide an uncured elastomeric tube with a synthetic yarn reinforcement and then during completion of the hose to embed the reinforcement in the elastomeric material a fixed uniform distance radially inward from the outer surface of the hose where it is protected from abrasion and is relatively immune to chemical or biological action.

Furthermore in accordance with our invention but a single instead of two extrusions of elastomeric material is required and a yarn reinforcement of controlled dimensions is formed about it, directly after which it is encased in a lead jacket of special conformation preparatory to curing; certain intermediate operations incident to present practice such as dusting, lubricating and the like may therefore be omitted.

It is therefore a principal object of the present invention to provide a hose of the character stated in which without sacrificing of bursting strength or other desirable physical properties manufacture of the hose is greatly simplified over that heretofore in vogue for production of hose intended for the same uses.

A further object is to provide a novel method of hose manufacture whereby the application of an outer covering layer of elastomeric material to a partly finished yarn reinforced uncured elastomeric tube is omitted yet the yarn is substantially embedded in elastomeric material in the finished hose.

Other objects, purposes and advantages of the invention will hereinafter more fully appear or be understood from the following description of the practice of the method it comprises during which reference will be had to the accompanying drawing wherein.

Figure 1:
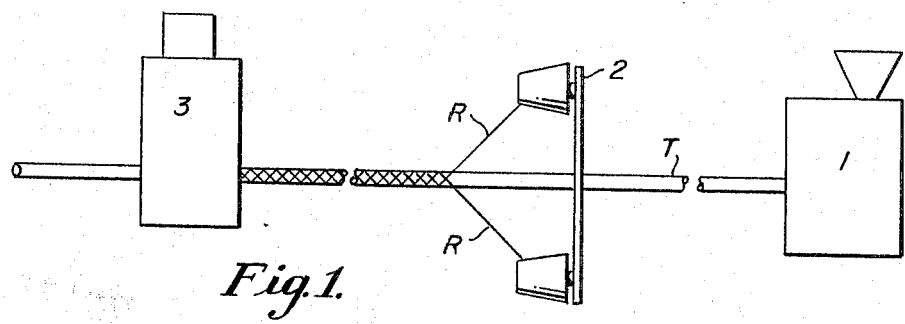
FIG. 1 is a diagrammatic fragmentary side elevation of apparatus utilized in making the hose.

Referring now more particularly to the drawing the apparatus diagrammatically illustrtaed in FIG. 1 includes spaced units in general not materially different from those heretofore employed in making hose including an extruder 1 through which elastomeric material is forced to form a tube T which then is passed through a reinforcing machine 2 which applies to the outer surface of tube T reinforcing elements R which may be yarn woven, knitted, braided or merely lapped in spiral layers of opposite hand as preferred. Yarn made from continuous filament fiber of nylon, polyester, terephthalate sold by E. I. du Pont de Nemours and Company, Wilmington, Delaware, as "Dacron," or other material relatively inert to deterioration by chemical or biological agents is normally used for making the reinforcement and its diameter is carefully controlled by appropriate selection of extruding dies and by manipulation of the machine applying it so its ultimate diameter is to a predetermined amount less than the maximum desired O.D. of the finished hose.

The next step in the manufacturing operation is the application of a lead jacket over the reinforced tube and it may be noted at this point that as the outer surface of the assembly is formed by the yarn reinforcement no dusting or other measures are necessary to keep adjacent convolutions on a pan or the like from adhering together as the reinforcing yarns prevent this. The reinforced tube can therefore be fed directly from the machine 2 to a lead press 3, or in a batch method similarly fed after a length of it has been accumulated on a pan, but in neither case is its lubrication required in its passage into the lead press for the reason just explained.

Figure 2:
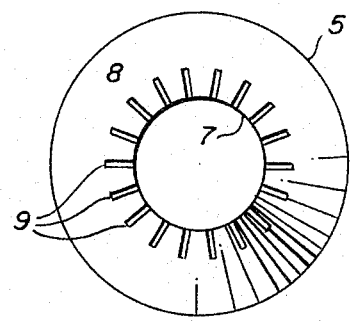
FIG. 2 is an end view of one of the die members utilized in applying a lead jacket to the uncured hose.
Figure 3:
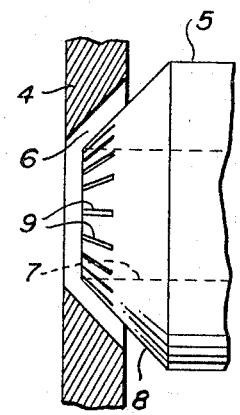
FIG. 3 is a fragmentary side elevation of said die member with its cooperative member in section associated therewith.
Figure 4:
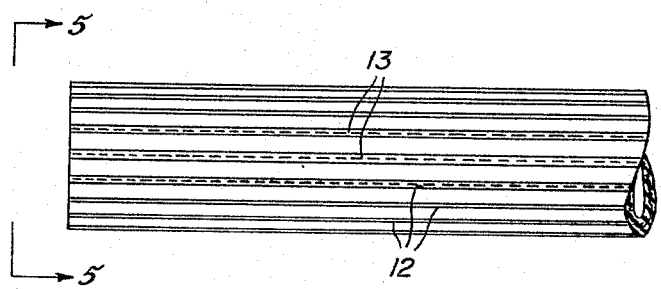
FIG. 4 is a side elevation of a piece of the finished hose.
Figure 5:
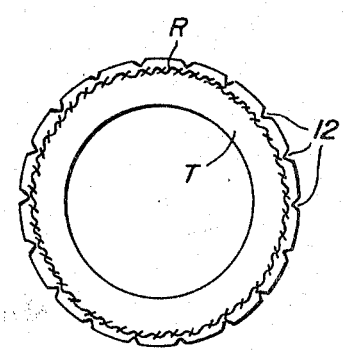
FIG. 5 is an enlarged end view on line 5—5 in FIG. 4.
Figure 6:
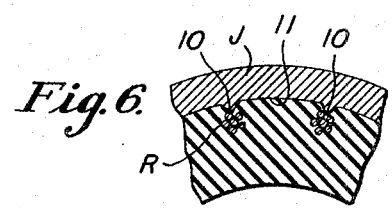
FIG. 6 is a fragmentary transverse section through the hose enclosed in the lead jacket.

This press, which in general is of standard type for extruding a metallic lead jacket on hose as in prior practices, is provided in accordance with our invention with cooperative die members 4, 5 (FIG. 2 and 3), one of which is of special configuration, which when assembled in the press define a substantially annular extrusion aperture 6 through which hot lead is forced by a plunger (not shown) as the hose is fed through the central orifice 7 in die member 5. The front substantially conical surface 8 of this member defining the inner margin of aperture 6 is provided with a plurality of circumferentially spaced substantially V-shaped grooves 9 whereby complementary V-shaped ribs 10 are formed in the interior of the lead jack J to limit radial expansion of the yarn reinforcement during subsequent operations. After the hose has been jacketed with lead as described and usually reeled in the customary manner with its ends closed by clamps the passage within the hose is subjected to fluid pressure of the order of 30 p.s.i. and the jacketed hose under that pressure is then passed into an autoclave (not shown)

maintained at about 298° F. by live steam under pressure of about 50 p.s.i. At this temperature of course the elastomer softens and becomes semi-fluid so the internal pressure readily forces it to exude through the interstices in the fabric reinforcement and into contact with the lead jacket in the grooves 11 defined by the longitudinal ribs 10 in the jacket (FIG. 6), said ribs keeping the reinforcement from entering the grooves, and hence spaced inwardly from the outer surface of the hose. Consequently after the elastomer has been cured, cooled, the internal pressure relieved and the lead jacket stripped off, a finished reinforced hose remains in the elastomeric outer surface of which are impressed longitudinal V-shaped grooves 12; at the bottoms of the latter there may appear isolated small exposures 13 of the yarn reinforcement R elsewhere embedded in the elastomeric body T of the hose. As these exposed portions 13 of the yarn lie considerably beneath the outer perimeter of the hose they are protected from abrasion and as the yarn is not susceptible to chemical or biological attack, no impairment in serviceability of the hose is traceable to such exposure.

It will thus be evident that our hose can be made with a total wall thickness (5/32" in 3/4" I.D. hose) substantially equal to that of hose heretofore made for like purposes by extrusion of two coaxial layers of elastomeric material with yarn reinforcement disposed between them, and as there is but one layer instead of a plurality of layers of elastomeric material in our hose, in part extruded from within so as to enclose the yarn reinforcement, there can be no failure of bonding between different layers as sometimes occurs in prior hoses especially when an inner layer is dusted to reduce tackiness before a yarn reinforcement is applied to it. The operations incident to the manufacture of our hose are, moreover, simplified and its production greatly accelerated in terms of labor required to make a given length.

Hence while we have herein described with considerable particularity one embodiment of the invention and have suggested certain alternatives available for use in the practice thereof, it will be understood we do not desire or intend to be limited or confined thereto or thereby in any way as changes and modifications in the structure of the hose as well as in the steps of the method of producing it will readily occur to those skilled in the art and may be employed if desired without departing from the spirit and scope of the invention as defined in the appended claims.

Having thus described our invention, we claim and desire to protect by Letters Patent of the United States:

1. The method of making hose which comprises the steps of extruding a tube of uncured elastomeric material, encasing said tube in a tubular reinforcing structure comprising continuous filament yarn, extruding about the reinforced tube a metallic lead jacket having circumferentially spaced longitudinal ribs projecting inwardly from its inner surface and into engagement with said reinforcement, subjecting the lead-jacket-encased reinforced tube to heat and internal pressure to thereby force elastomeric material radially through interstices in the reinforcement and into contact with the lead jacket between adjacent ribs therein and concurrently cure said elastomeric material, then relieving the internal pressure and stripping the lead jacket from the hose.

2. The method of making a hose which consists of extruding a unitary tube of uncured elastomeric material, winding around the tube reinforcing elements formed of synthetic fibers to provide a reinforcing structure, confining the tube and structure within a metallic jacket having substantially V-shaped ribs projecting inwardly from its inner surface, subjecting the tube to sufficient internal pressure and heat to force elastomeric material radially through interstices in said reinforcing structure and into contact with the jacket and concurrently heat curing the elastomeric material relieving said pressure and heat and removing the jacket to form a hose wherein the said reinforcing structure is embedded in concentric relation with and beneath the outer surface of the hose between adjacent grooves in said surface and exposed in similar concentric relation at spaced points in said grooves.

References Cited by the Examiner
UNITED STATES PATENTS

| | | | |
|---|---|---|---|
| 587,545 | 8/1897 | Cobb | 156—148 |
| 2,301,207 | 11/1942 | Garretson | 156—149 |
| 2,461,594 | 2/1949 | Flounders | 138—137 |
| 2,974,713 | 3/1961 | Hydrick | 156—244 XR |
| 3,042,737 | 7/1962 | Brumbach et al. | 156—244 |
| 3,084,086 | 4/1963 | Roberts et al. | 156—143 XR |

EARL M. BERGERT, *Primary Examiner.*

HAROLD ANSHER, *Examiner.*

P. DIER, *Assistant Examiner.*